July 22, 1930.  W. T. McSHEA ET AL  1,771,305
TASSEL FORMING MACHINE
Filed March 26, 1929    10 Sheets-Sheet 2
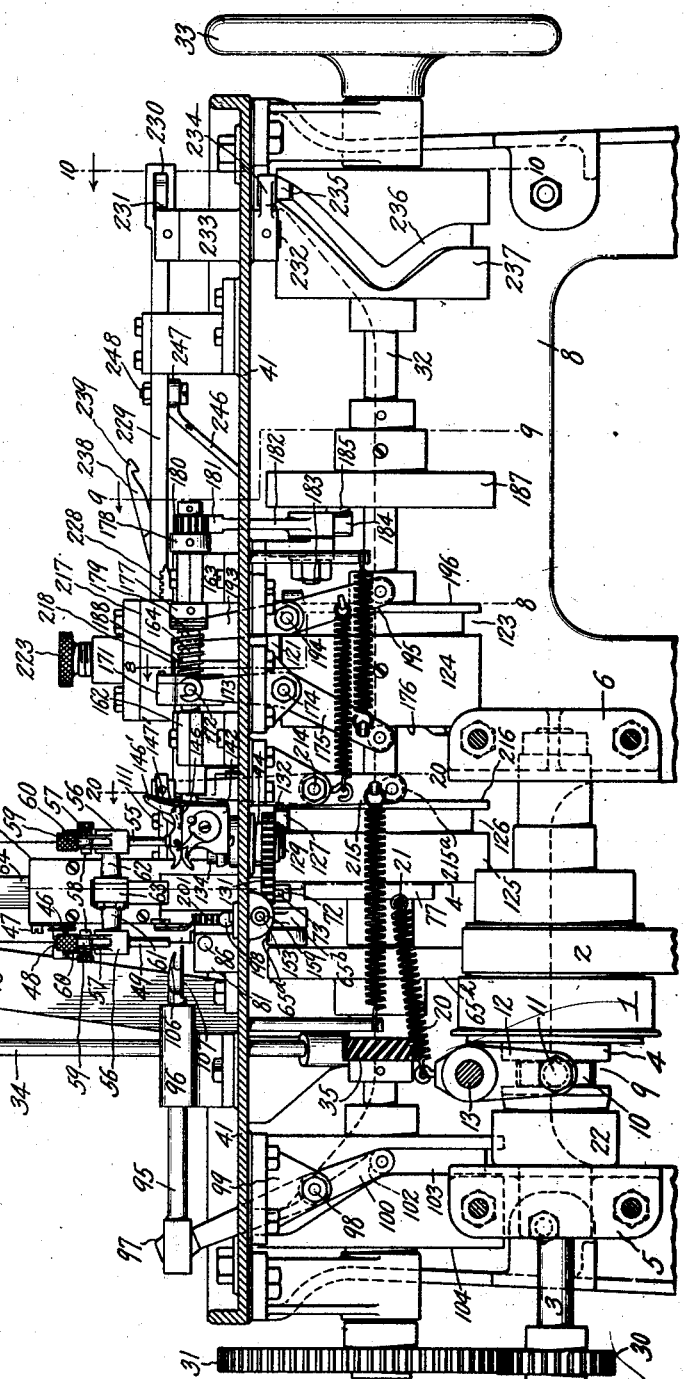
Fig.2.
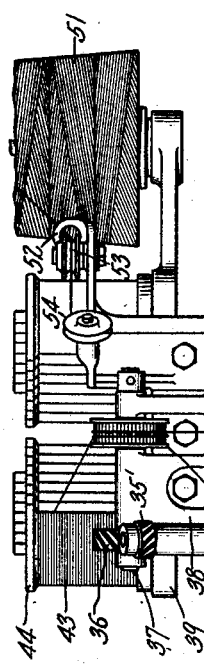
WITNESS
Oliver N. Holmes
INVENTORS
William T. McShea, Alexander C. Parlini + Emil Richter
By their Attorneys
Knight Bros.

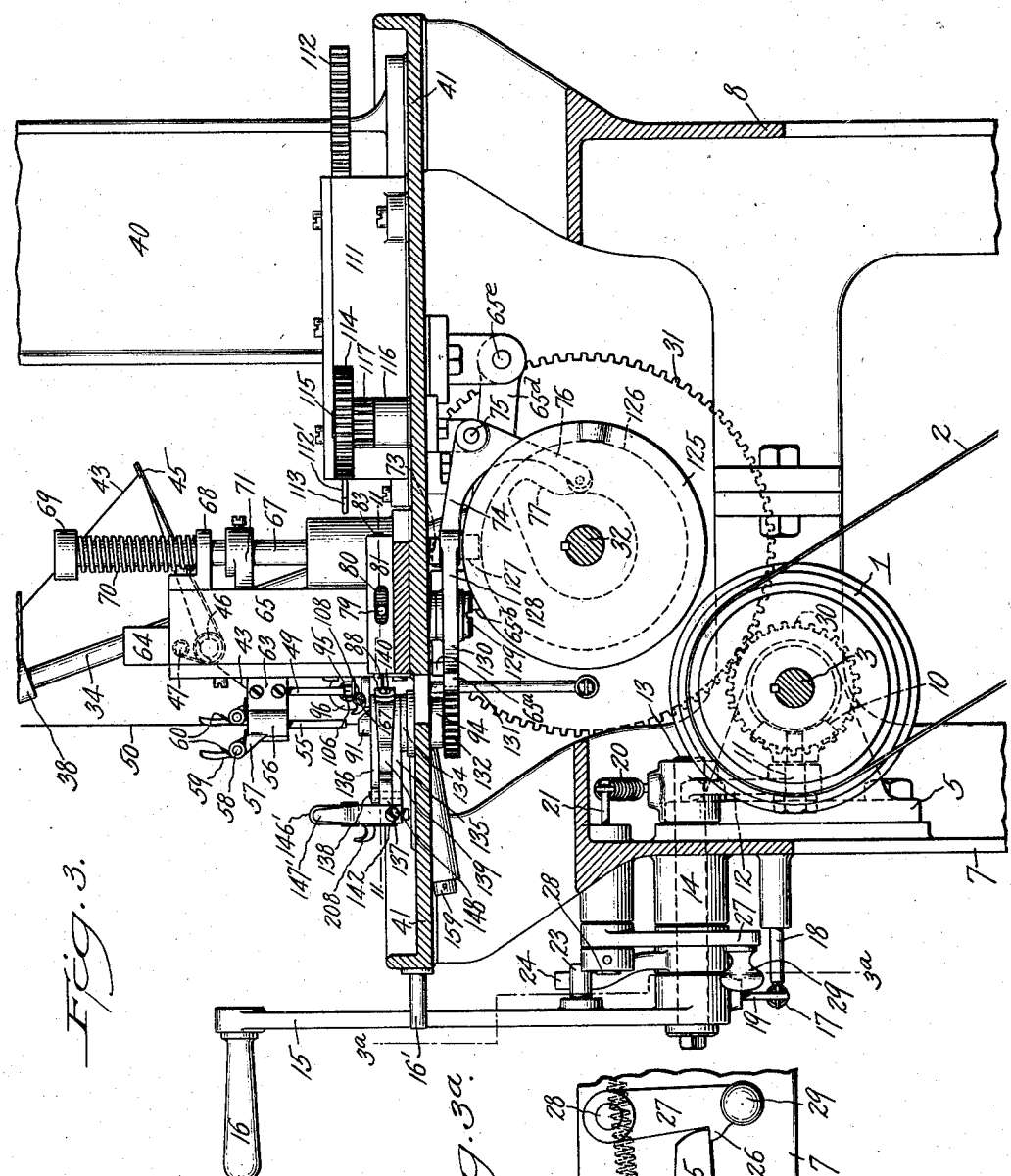

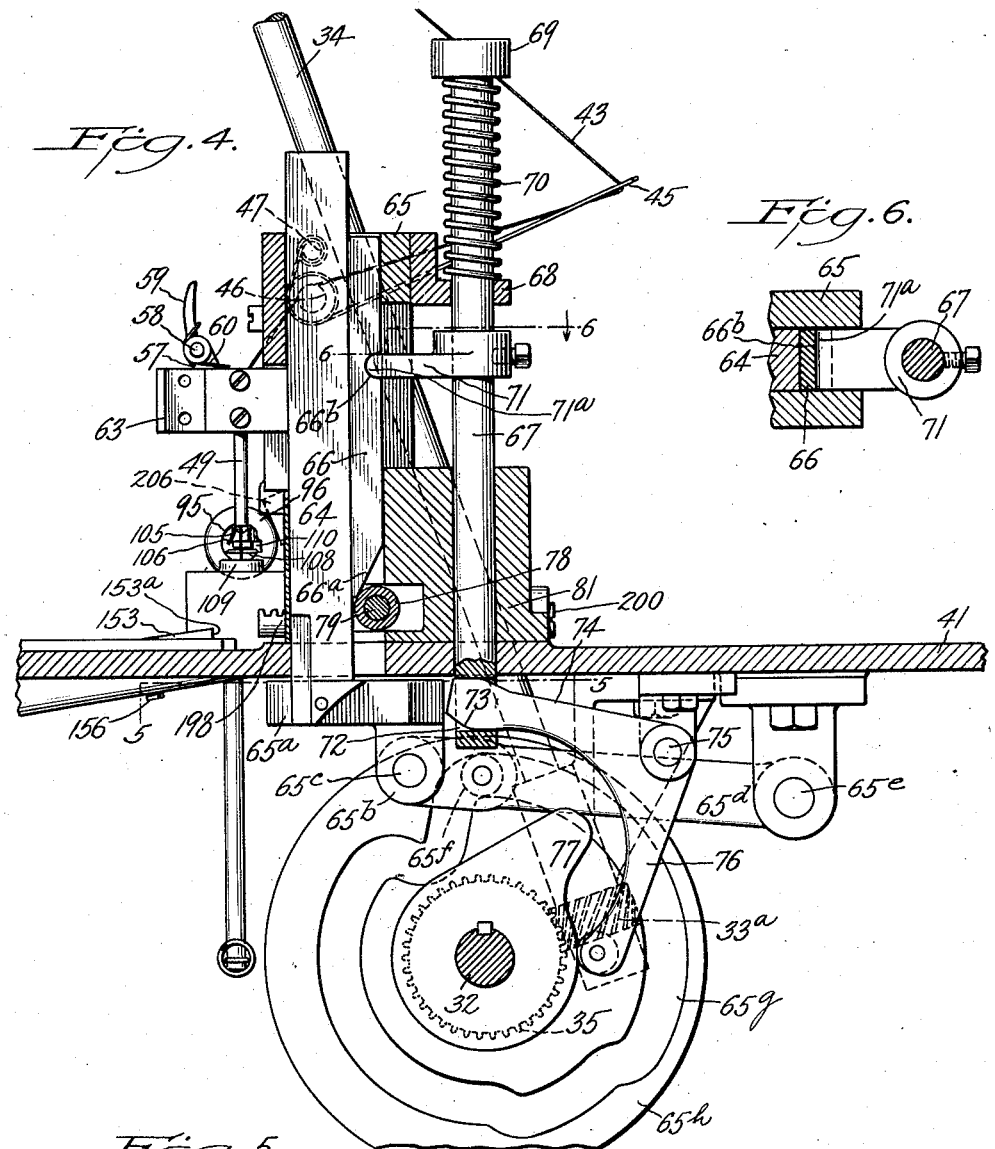
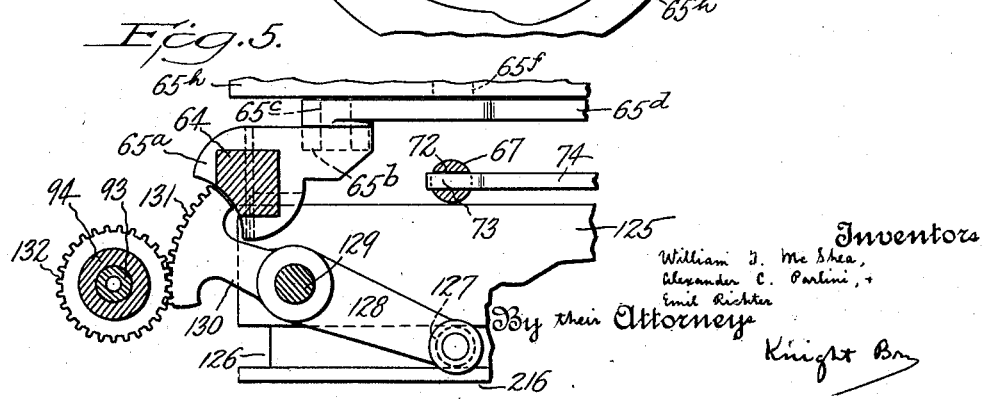

July 22, 1930.  W. T. McSHEA ET AL  1,771,305
TASSEL FORMING MACHINE
Filed March 26, 1929  10 Sheets-Sheet 5
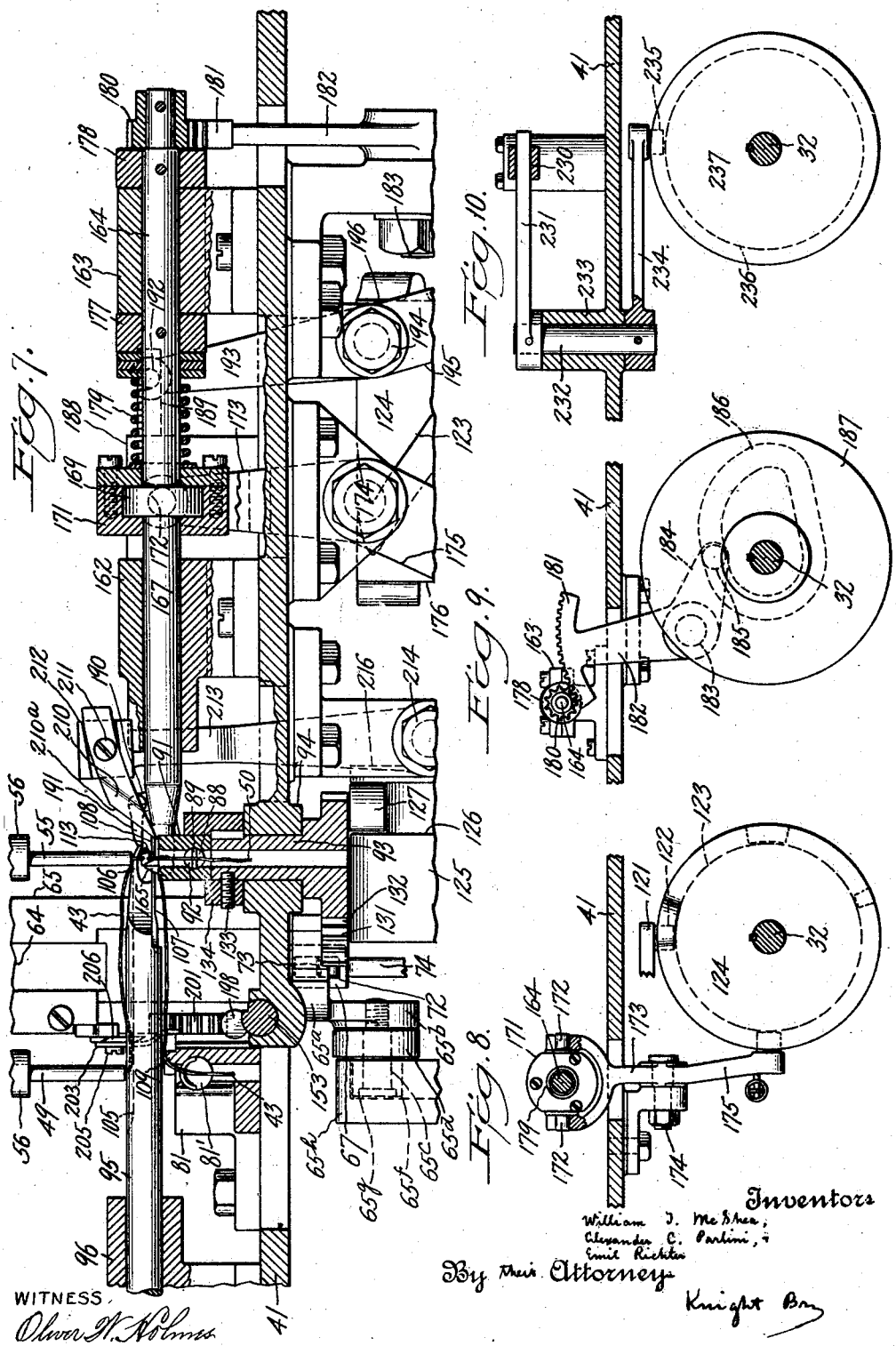

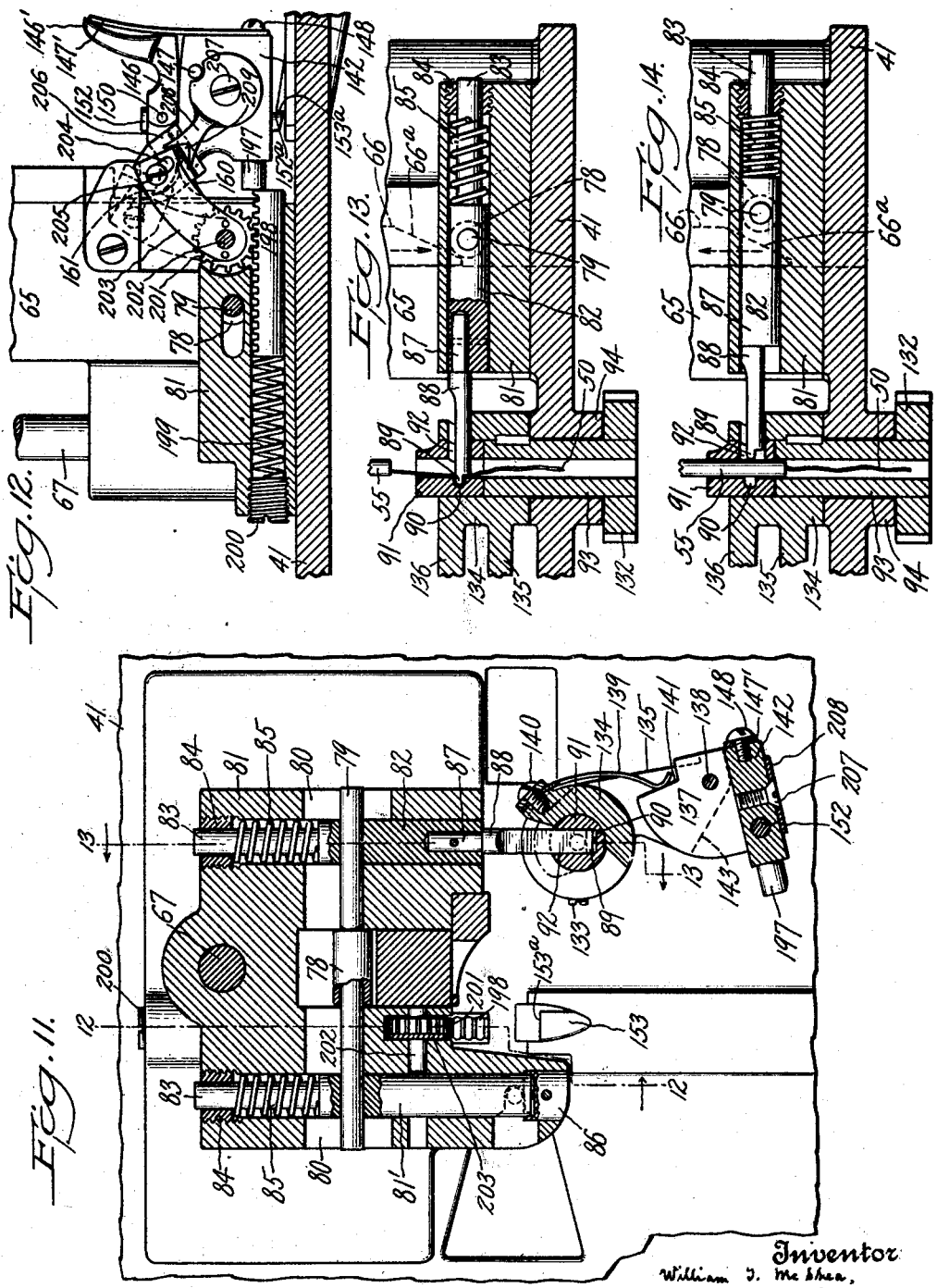

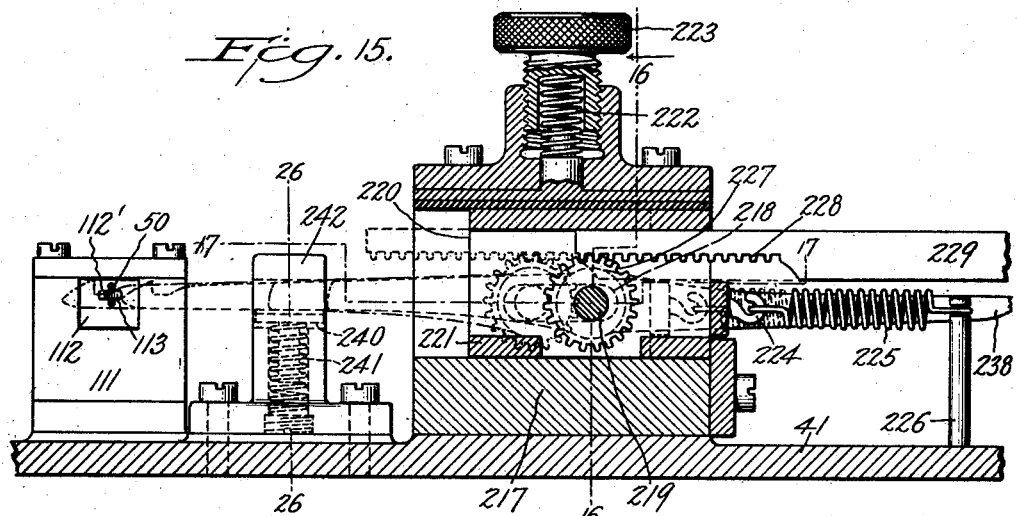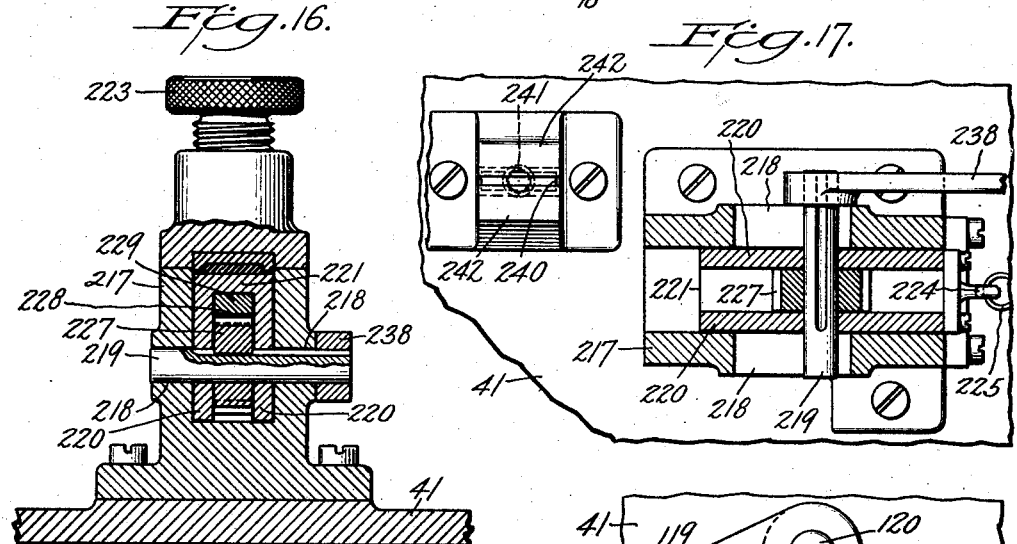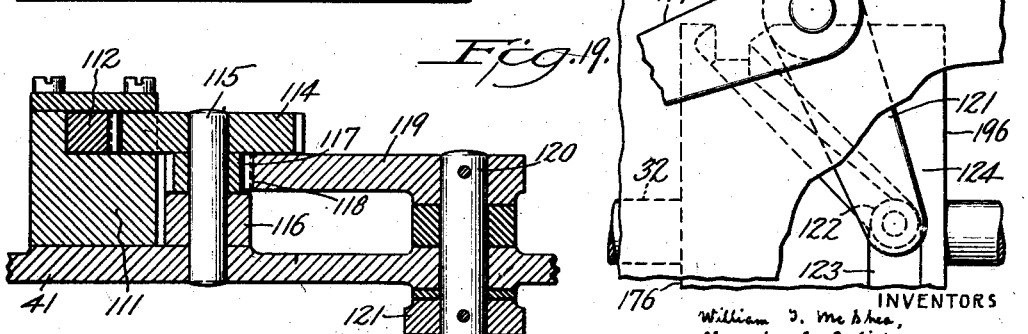

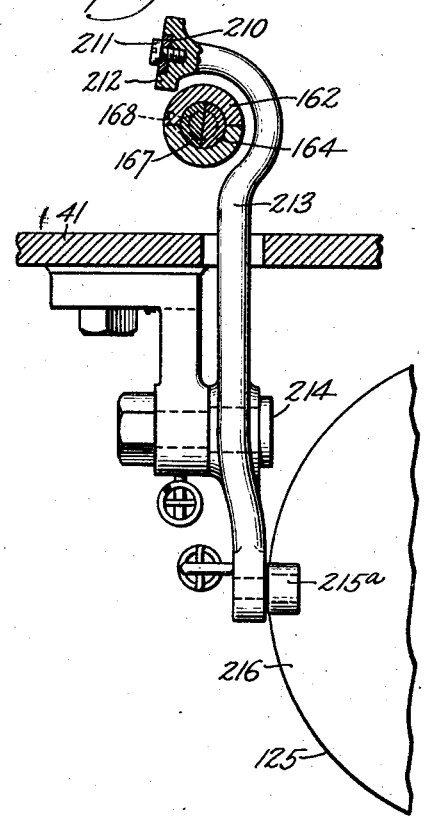
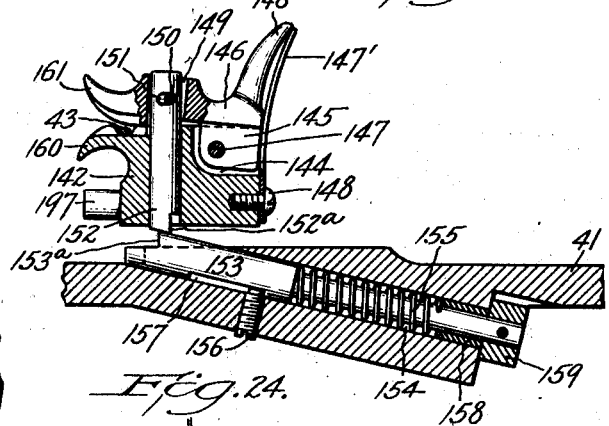
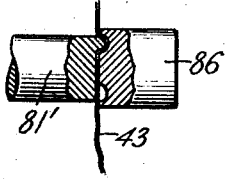
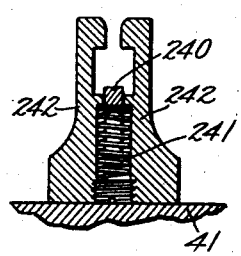
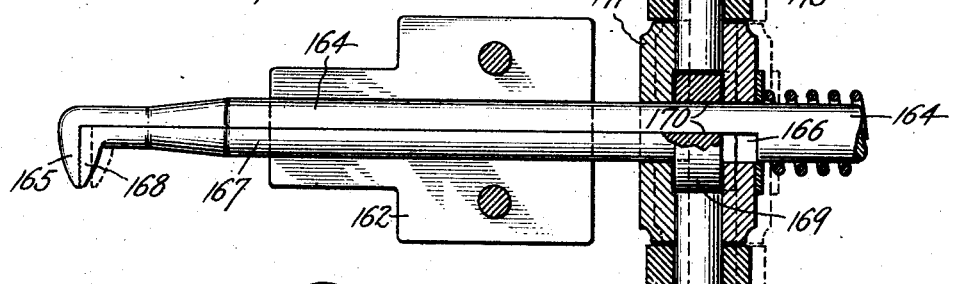

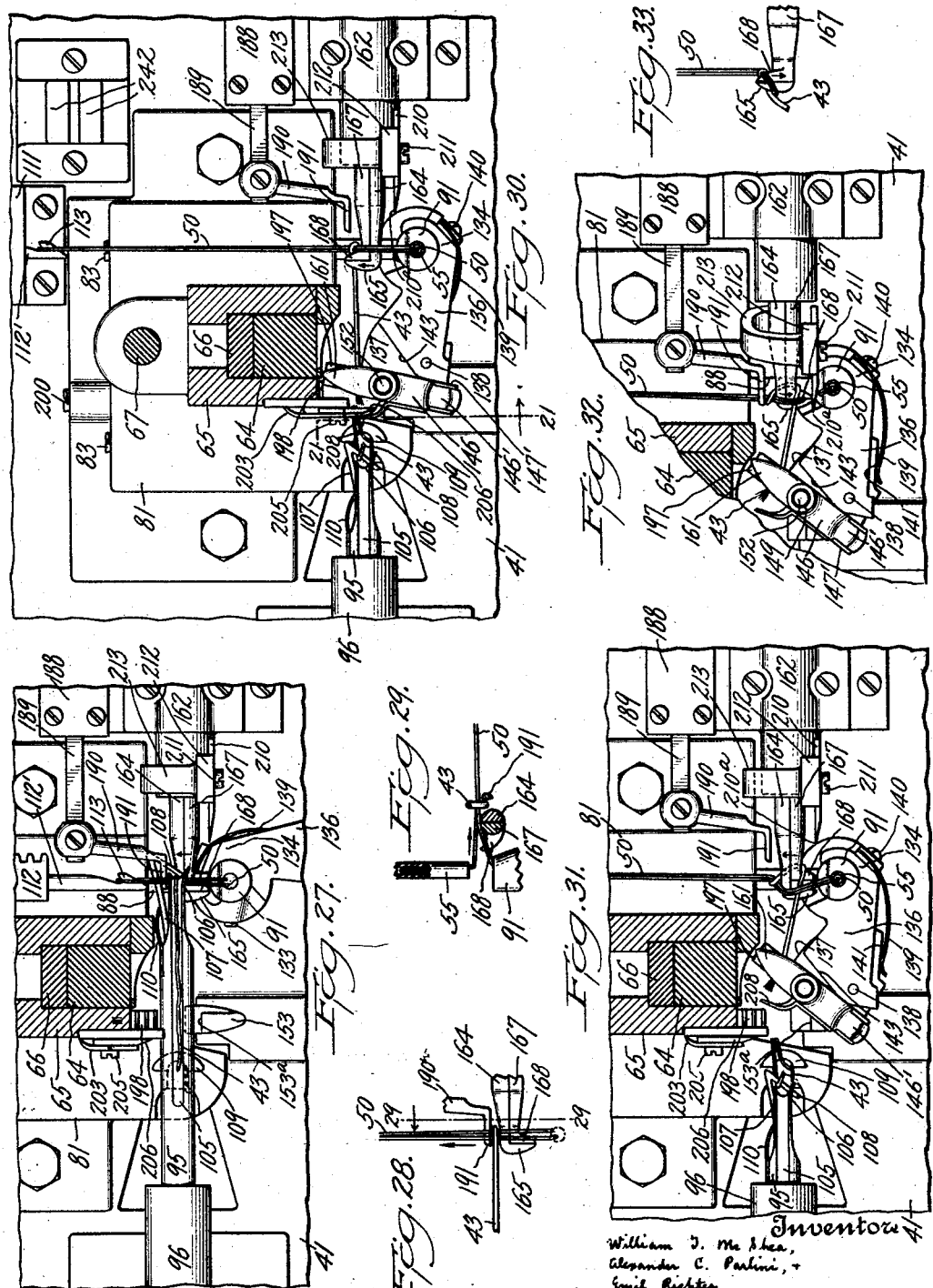

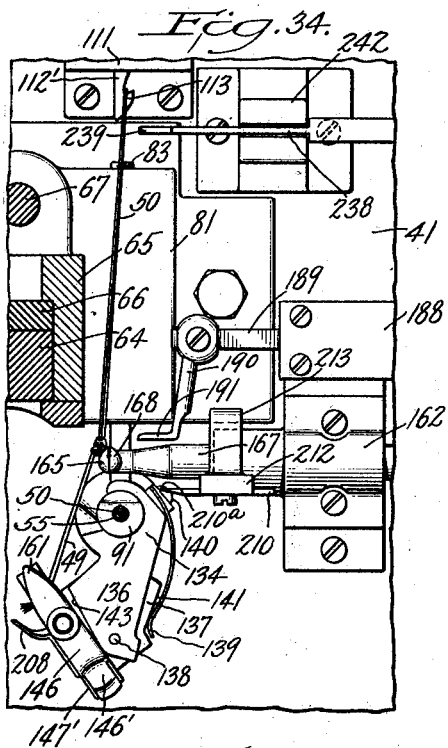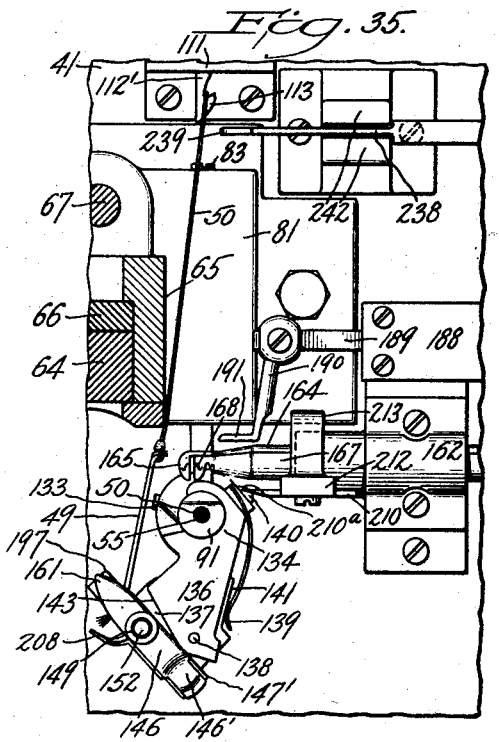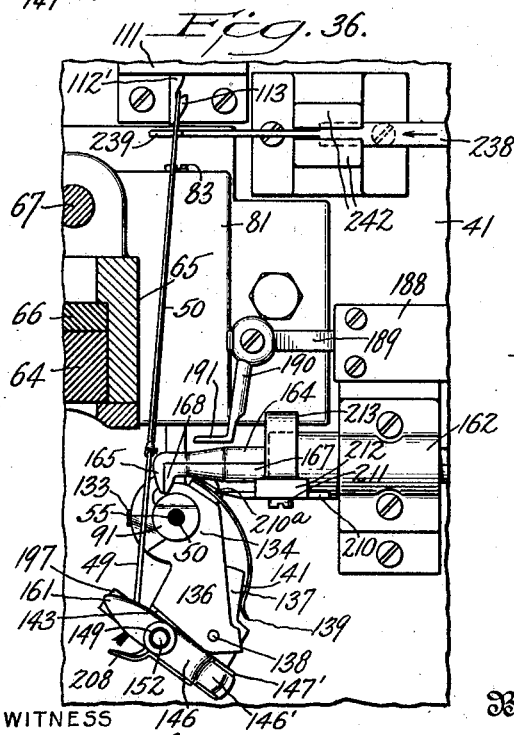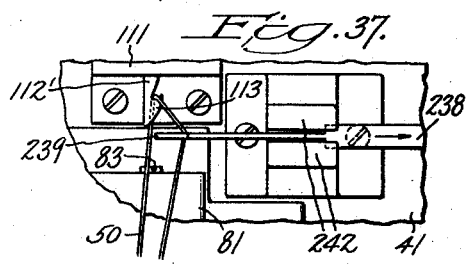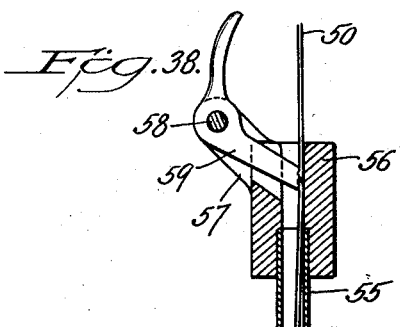

Patented July 22, 1930

1,771,305

UNITED STATES PATENT OFFICE

WILLIAM T. McSHEA, OF WEST NEW YORK, NEW JERSEY, AND ALEXANDER C. PARLINI, OF WOODSTOCK, AND EMIL RICHTER, OF BROOKLYN, NEW YORK, ASSIGNORS TO WILLIAM T. McSHEA CO. INC., OF NEW YORK, N. Y., A CORPORATION OF NEW YORK

TASSEL-FORMING MACHINE

Application filed March 26, 1929. Serial No. 350,005.

This invention relates to the construction of tassels or the like and their attachment to a suspension cord or hanger and to machines for constructing articles of this nature which have heretofore been made by hand. As an example of an article of manufacture of this character may be mentioned the tassels or cords which are usually attached to tally or place cards employed in games and the like. The purpose of our invention is to provide a machine which will be completely automatic in its action and by means of which articles of the character referred to can be made more effectively and rapidly and in general more economically produced and handled than is possible by hand labor.

The primary object of our invention is to provide an improved construction, combination, and arrangement of parts in each of several mechanisms as well as an improved cooperative arrangement and operation of said mechanisms in a machine for making tassels or articles of similar nature. For example, in the particular embodiment shown on the drawings, our invention contemplates an improved construction, arrangement and operation of silk-looping mechanism, cord-looping mechanism, knot-forming mechanism and other devices hereinafter described for making and delivering tassels for place cards and the like.

Specific objects of our invention reside in a silk-gripper for holding and controlling a doubled strand of silk which has been severed from the main stock or supply and a chuck for holding and controlling a severed section of cord while it is being doubled, knotted, and securely fastened to the doubled strand of silk held by the silk-gripper. For this purpose, suitable means are provided for rotating the cord-holding chuck in one direction, for opening the jaws of said chuck for admitting the doubled cord and closing said jaws thereon and finally for reversing the rotation of the chuck for forming the knot in conjunction with the silk-gripper.

Other and further objects of our invention will appear in the specification, the features relating thereto being recited in the appended claims and illustrated in the accompanying drawings which show an embodiment of our invention.

According to the embodiment of our invention shown on the drawings,

Figure 2 is a side elevation of the same with portions removed and parts shown in section.

Figure 3 is a section on the line 3—3 of Figure 1. Figure 3ª is a fragmentary side elevation of some of the clutch-control connections shown at the left in Figure 3.

Figure 4 is an enlarged vertical transverse section on the line 4—4 of Figure 2, parts being shown in elevation.

Figure 5 is a fragmentary horizontal section corresponding to the line 5—5 of Figure 4, parts being shown in plan.

Figure 6 is a detail section corresponding to the line 6—6 of Figure 4.

Figure 7 is an enlarged vertical longitudinal section corresponding to the line 7—7 of Figure 1, parts being broken away and parts shown in elevation.

Figure 8 is an enlarged fragmentary transverse section corresponding to the line 8—8 of Figure 2, parts being shown in elevation.

Figure 9 is an enlarged fragmentary transverse section corresponding to the line 9—9 of Figure 2, parts being shown in elevation.

Figure 10 is an enlarged fragmentary transverse section corresponding to the line 10—10 of Figure 2, parts being shown in elevation.

Figure 11 is an enlarged horizontal section corresponding to the line 11—11 of Figure 3, parts being shown in plan.

Figure 12 is a vertical section corresponding to the line 12—12 of Figure 11.

Figure 13 is a vertical section corresponding to the line 13—13 of Figure 11.

Figure 14 is a section similar to Figure 13 with the parts shown in changed positions.

Figure 15 is an enlarged vertical longitudinal section corresponding to the line 15—15 of Figure 1.

Figure 16 is a vertical transverse section corresponding to the line 16—16 of Figure 15, parts being broken away and parts shown in elevation.

Figure 17 is a fragmentary horizontal section corresponding to the line 17—17 of Figure 15, parts being shown in plan.

Figure 18 is an enlarged vertical section corresponding to the line 18—18 of Figure 1.

Figure 19 is a fragmentary top plan view of the cam operating connection for the segmental rack shown in Figures 1 and 18.

Figure 20 is an enlarged vertical transverse section corresponding to the line 20—20 of Figure 2.

Figure 21 is a vertical transverse section corresponding to the line 21—21 of Figure 30, showing the relative positions of the parts before release of the tripping mechanism.

Figure 22 is a detached top plan view of the knot-tying chuck and contiguous operating parts, parts being broken away and parts shown in section.

Figure 23 is a perspective detail of the control end of one of the string gripper jaws of the knot-tying chuck.

Figure 24 is a fragmentary detail of the silk-gripper, parts being broken away and parts shown in section.

Figure 25 is an end view of the anvil gripper shown in Figure 24.

Figure 26 is a detail vertical section on the line 26—26 of Figure 15.

Figure 27 is a fragmentary plan view of the silk-looping and cord-looping mechanisms, said mechanisms being shown in their relative positions shown at the left in Figure 7.

Figure 28 is a fragmentary detail showing the relation of the silk and cord loops after the silk-looping plunger has been retracted from its position shown in Figure 27.

Figure 29 is a fragmentary section corresponding to the line 29—29 of Figure 28.

Figure 30 is a fragmentary plan view similar to Figure 27 with the silk-looping plunger and cord-looping ram retracted, the knot-tying chuck having revolved 180 degrees from its position shown in Figure 27 for the commencement of its knotting operation.

Figure 31 is a similar view showing a further stage in the knot-tying operation with the jaws of the chuck open for admitting the doubled cord.

Figure 32 is a fragmentary plan view of the same parts showing a further stage in the knot-tying operation with the jaws of the chuck closed upon the doubled cord immediately preceding the cord-cutting operation and in preparation for the reverse movement of the knotting chuck.

Figure 33 is a fragmentary detail showing the position of the chuck after a reverse movement of approximately 225 degrees.

Figure 34 is a similar plan view showing the near completion of the knot-tying operation and just before the chuck jaws have opened to release the cord.

Figure 35 is a similar plan view showing the chuck jaws opened and with the knotted cord and silk suspended between the silk-gripper and cord-engaging hook.

Figure 36 shows a further stage in the operation with the knot drawn tight by a counterclockwise movement of the silk gripper.

Figure 37 is a fragmentary plan view showing the tassel-removing lever at the beginning of its tassel-discharging movement.

Figure 38 is a fragmentary detail of one of the braking devices which prevent retrograde movements of the silk and cord stocks.

Figure 1:
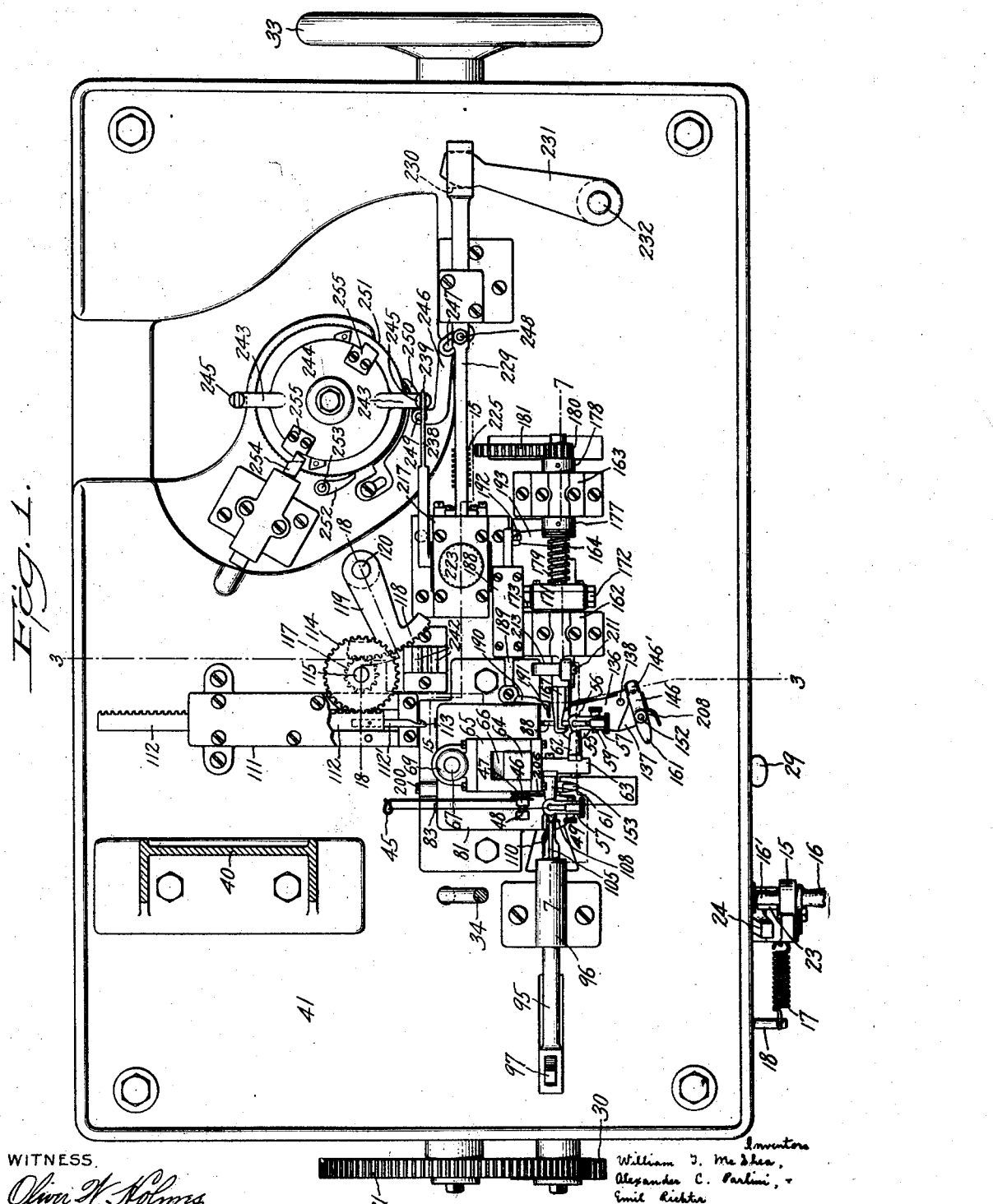
Figure 1 is a top plan view of the tassel-forming machine with portions of the super-structure for holding the silk and cord supplying devices removed.

According to the preferred embodiment of our invention shown on the accompanying drawings, one and the same power-driven cam shaft is employed for operating the several mechanisms which comprise the machine.

*Clutch-control and power connections for cam shaft*

Referring more especially to Figures 1, 2, 3, and 4, a cone pulley 1 which is driven by an endless belt 2, is journaled freely upon a power shaft 3 to which is splined a clutch block 4, said power shaft being journaled in axially-spaced bearings 5 and 6 carried by one of the side frames 7 and 8. Slidable within a peripheral groove 9 in the clutch block 4 is a segmental block 10 which is mounted on a stud 11 carried by a rock-arm 12 which is secured to a rock-shaft 13. Said rock-shaft is oscillatably mounted in a bearing 14 and at its outer end movably supports a crank arm 15 provided with a handle 16. A laterally-projecting pin 16' on the main frame of the machine serves to limit the displacement of crank arm 15 in one direction under the tension of a spring 17 said spring 17 being connected at one end to a pin 18 which projects outwardly from the side frame and at its other end to a pin 19 which is presented downwardly from the hub portion of the crank-arm 15. Said spring 17 tends to hold the crank-arm 15 against the pin 16'. A tension spring 20 shown in Figures 2 and 3 is connected at one end to a pin 21 presented inwardly from side frame 7 and at its other end to the hub portion of the rock-arm 12. This spring 20 tends to hold the clutch block 4 in clutching engagement with a fixed braking element 22 rigid with the bearing 5. Projecting inwardly from the crank arm is a pin 23 adapted to engage one arm 24 of a bent lever which is keyed to rock-shaft 13, the other arm 25 of said bent lever being adapted to be engaged and supported by a lug 26 which as shown in Figure 3ᵃ projects from the lower end of a latch-arm 27 which is pivotally suspended from a fixed pin 28 and is provided with a rounded knob 29. It will be understood from this description that whenever the crank-arm 15 is moved into engagement with the arm 24 of the bent lever, the clutch block 4 will be moved out of engagement with the braking element 22 and into clutching engagement with the cone pulley 1 which sets the machine in motion. At the same time the arm 25 is lifted above the lug 26 of latch-arm 27 which maintains the clutch in running position until such time as the latch-arm 27 is moved to release position when the clutch is thrown to braking position by the tension of spring 20. Keyed to the power shaft 3 is a spur pinion 30 which meshes with a large spur gear 31 keyed to a longitudinal shaft 32 which carries a series of cams for effecting the several operations of the machine in the manner to be hereinafter pointed out. This cam shaft is provided at one end with a hand wheel 33 by means of which the machine may be turned over when the power connections are disconnected.

Silk-feeding mechanism

Referring more especially to Figures 2 and 4, a spiral gear 35 which is keyed to the cam shaft 32, meshes with a spiral worm 33ª which is keyed to the lower end of an inclined shaft 34. Keyed to the upper end of said shaft 34 is a worm pinion 35′ which meshes with a worm-wheel 36 keyed to a rotary shaft 37, said rotary shaft 37 being mounted in suitable bearings 38 carried by a frame 39 which is supported by a standard 40. The standard 40 is mounted upon the top plate or table 41 of the machine. Keyed to the shaft 37 is a feeding drum 42 around which is wound several turns of a strand 43 of silk, said drum operating to draw the silk from a spool 44. As shown best in Figure 4, the strand of silk moves downwardly from the drum and is threaded through the outer end of a spring finger 45 which is wound around a supporting pin 46 and has its other end secured to a fixed pin 47. Moving downwardly from the outer end of spring finger 45, the strand 43 passes over a pulley 48 to the upper end of a tubular guide or needle 49 which is raised and lowered in the manner to be hereinafter explained.

Cord supply and feeding mechanism

As shown in Figure 2, a cord 50 as it leaves a spool 51 passes through a fixed guide 52 and thence to a guide roller 53 over which it passes to a second guide roller 54 from which it is drawn downwardly through a tubular guide or needle 55 which rises and falls with the tubular guide or needle 49. Each of said tubular guides is presented downwardly from a boss or socket 56 which also carries an upwardly inclined arm 57 as shown in Figure 38. Pivotally mounted on a pin 58 in the arm 57, is a dog or brake 59 which is provided with a spring 60 which adapts it to grip the silk or cord on its downward movement but permits the silk or cord to slip through the tubular guide during the upward movements of the latter. As indicated in Figure 2, the bosses or sockets 56 are carried by oppositely-presented arms 61 and 62 mounted on a post or carrier 63 which as shown best in Figure 4 is mounted on a vertically-reciprocable plunger 64. Said plunger 64 slides in a box-like guide 65 and at its lower end carries a bracket arm 65ª with a depending lug 65ᵇ. To a pin 65ᶜ carried by the depending lug 65ᵇ is pivotally connected the outer end of a cam-arm 65ᵈ which is oscillated on a fixed pin 65ᵉ by means of a cam-roller 65ᶠ operating in a cam groove 65ᵍ of a cam 65ʰ which is keyed to cam-shaft 32. A cam bar 66 which is provided with a downwardly-presented wedge 66ª, is reciprocably mounted between the plunger 64 and the guides 65 and is provided with a recess 66ᵇ. A reciprocatory rod 67 which slides in a bracket 68 and a base block 81, carries a fixed collar 69 between which and said bracket 68 is interposed a compression spring 70. Secured to the rod 67 is an arm 71 with a rounded end 71ª fitting into the recess 66ᵇ in the cam-bar 66. The lower end of the reciprocatory rod 67 is provided with a slot 72 in which the rounded end 73 of one arm 74 of a bell crank lever oscillates. Said bell-crank is pivoted on a pin 75 and is provided with a cam-arm 76 operated by a cam 77, said cam being keyed to the cam-shaft 32.

Automatic grippers for silk and cord

Referring more especially to Figure 11, the lower wedge-shaped end 66ª of the cam-bar 66 shown in Figure 4, is adapted on its downward movement to engage a cam roller 78 journaled on a transverse rod 79. Said rod has its opposite ends slidable in oppositely-arranged slots 80 formed in the guide block 81. Connected to the rod 79 on opposite sides of cam-roller 78 are slides or plungers 81′ and 82, each of said slides being provided with a reduced end 83 slidable in an annular plug 84 between which and each of said slides or plungers is interposed a compression spring 85. As shown in Figures 11, 24, and 25, the slide 81′ is provided at its forward end with a gripping face adapted to cooperate with an anvil gripper block 86 for anchoring the end of the strand of silk which is lowered between said grippers during the descending movements of the tubular guides or needles 49.

Referring more especially to Figures 11, 13, and 14, it will be seen that the plunger 82 is provided with a cylindrical socket to receive the reduced end 87 of a gripper rod 88 which is provided with a nib 89 movable into and out of a correspondingly shaped recess 90 formed in the inner wall of a nipple or sleeve 91. The outer end of gripper rod 88 reciprocates through a radial opening 92 which extends through the annular wall of nipple or sleeve 91 opposite to recess 90, the successive ends of cord being periodically gripped between the nib 89 and recess 90 during successive cord-feeding operations. As shown in Figures 13 and 14, the nipple or sleeve is retained in position upon the upper end of a hollow spindle 93 which is oscillatably mounted in a bearing boss 94 formed in the top plate or table 41.

Mechanism for looping the silk

As shown in Figure 7, the silk strand as it depends from the silk guide or needle hangs in the gripping plane of the silk grippers 81' and 86. Reciprocable in this plane is a plunger 95 which is slidably mounted in a guide bracket 96 mounted on the top plate or table 41. Articulately connected to the rear end of the plunger 95 is one arm 97 of a cam lever which is pivoted at 98 in a bracket 99. The cam arm 100 of said cam lever is provided with a roller 102 which operates in a cam slot 103 in the peripheral face of a cam 104 which is keyed to the cam shaft 32. The construction and arrangement of said cam is such that the silk-looping plunger is reciprocated once between the time that the silk guide reaches its upper extremity of movement and begins its downward movement therefrom. As shown best in Figure 7, the silk guide in its upper position is arranged immediately above the silk-looping plunger 95, said plunger being provided with a longitudinal groove 105 for guiding the silk during the movement of said plunger while drawing the silk into an open loop. At its forward end, said looping plunger is provided with a lip or finger 106 which overhangs a spring finger 107 which is provided at its outer end with a V-shaped hook or finger 108 which by means of a leaf-spring 110 is yieldably retained in its normal position as shown best in Figures 30 and 31. As shown in Figure 7, after the guide or needle 49 has descended to present the end of the silk to the silk grippers and again moved upwardly to make way for the looping plunger 95, said looping plunger as it moves forwardly draws the strand of silk tight over a part-circular guide or recess 109 while drawing the silk through the guide or needle into an open end loop.

During the forward movement of the silk-looping plunger 95, the lower end of the strand of silk is anchored between the silk-gripping slide 81' and block 86 while at the same time, a supply of silk is being drawn under the spring-pressed dog or brake 59. As the inclined outer edges of the V-shaped hook or guide 108 strikes the tautly-drawn silk, it is displaced laterally until the silk slides into the angular notch within the hook or finger 108 so that upon the return movement of the plunger 95, said finger will act as a drag on the strand of silk.

Mechanism for looping the cord

Mounted upon the top plate or table according to Figures 1 and 3 of the drawings, is a box-like housing 111 within which is reciprocably mounted a rack or ram 112. A flat bar 112' which is presented endwise from the ram 112 is provided at its outer end with a hook or gripper 113. Meshing with the rack bar 112 is a spur gear 114 which as shown best in Figure 19 is keyed to a rotary shaft 115, said shaft being journaled in the top plate or table 41 and a bearing block 116 carried thereby. Also keyed to the shaft 115 is a smaller spur gear 117 which meshes with a segmental rack 118 carried by a radial arm 119 keyed to a rotary shaft 120. This rotary shaft is also journaled in the top plate or table. Keyed to the lower end of rotary shaft 120 is a cam arm 121 which as shown in Figure 19 carries a cam roller 122 operating in a cam slot 123 in the peripheral face of a cam 124 which is keyed to the cam shaft 32. It will be understood from this description that as the cam rotates, the cord-looping ram will be reciprocated periodically in such a way as to present the hook or gripper 113 through the looped silk and open recess in the forward end of the silk-looping plunger 95.

Looped silk gripper and mechanism for operating same

Referring now to Figures 3, 5, and 7, keyed to the cam shaft 32 is a cam 125 which is provided with a peripheral cam groove 126 within which runs a cam roller 127 mounted on one arm 128 of a cam lever which is oscillatably mounted on a stud 129 depending from the under side of the top plate or table 41. The other arm 130 of said cam-lever carries a segmental rack 131 which meshes with a spur gear 132 on the lower end of the hollow spindle 93 which is oscillatably mounted in the bearing boss 94 in the top plate or table 41 as described above. Secured to the upper end of the hollow spindle 93 by means of a set screw 133, is the hub portion 134 of a radial arm which comprises an under plate 135 and an upper plate 136. Arranged between said plates as shown best in Figure 11, is a sector-like plate 137 which is pivotally mounted upon a pin 138 extending between said axially-spaced plates. A leaf spring 139 which is secured at one end by a screw 140 to the hub portion 134 of said radial arm, presses at its outer end against a flat surface 141 on the sector-like plate 137 and thus tends to maintain said plate in the position shown in Figure 11. Secured to the outer edge of the sector-like plate 137, as shown in Figure 21, is gripper block 142 which is adapted by a pivotal movement of plate 137 to abut laterally against the inclined edges 143 of the under and upper plates 135 and 136 of the radial arm (see broken line in Figure 11). The lower gripper block 142 is provided with a rectangular recess or slot 144 in its upper rear corner to accomodate a depending lug 145 on an upper gripper block 146, a transverse pin or pivot 147 forming an articulated connection between said gripper blocks. An upwardly-presented finger grip 146' constitutes a slidable abutment for the upper end of a leaf spring 147' which is secured at its lower end by a screw 148 to the lower gripper block 142. The upper gripper block is provided with a central opening 149 across which extends a pin 150, said pin being movable within a slot 151 in the upper end of a latch dog 152 which is reciprocably mounted in a vertical hole in the lower gripper block 142. At its lower end said latch dog is provided with an angular tooth 152ª whereby it is adapted to interengage with an angular shoulder 153ª on the outer end of an upwardly inclined latch-bolt 153, said latch-bolt being reciprocably mounted in a tubular socket 154 extending through the top plate or table. The outward displacement of said latch-bolt by a compression spring 155, is restricted by a set screw 156, the inner end of said set screw being presented within a longitudinal groove 157 in the under side of said latch-bolt. The compression spring 155 is mounted on a reduced portion of the latch-bolt which slides in a bushing 158. A collar 159 limits the outward throw of the latch-bolt under the pressure of compression spring 155. The upper and lower gripper blocks 146 and 142 are provided with gripper jaws 160 and 161 which are suitably formed to admit and close upon the double strand of silk presented thereto.

*Rotary knot-tying chuck and operating connections therefor*

As shown in Figure 7, two axially spaced bearings 162 and 163 are secured to the top plate or table and as shown in Figure 1, said bearings are arranged slightly out of alignment with the axis of the silk-looping plunger. Journaled in one of these bearings is the elongated shank 164 of an improved knot-tying chuck which is provided with a laterally-presented cord-gripping jaw 165. The shank 164 is provided with a longitudinal slot or recess 166 within which fits the complementary shank-portion 167 of a second cord-gripping jaw 168. The shank-portion 167 is shorter than the slot or recess 166 in the shank 164 so as to permit the opening and closing of the jaws 165 and 168 by an endwise movement of the shank portion 167. The gripper jaws 165 and 168, which are normally closed, form a tapered horn about which the strands are temporarily coiled one after the other during the knot-tying operation.

As shown in Figure 22, the complementary shank portions of the relatively movable cord-gripper jaws together form a round body rotatable in the other one of the bearings. The reciprocatory shank 167 carries at one end a cylindrical collar or flange 169. Said collar or flange is provided with a slot 170 by means of which it is non-rotatably but slidably mounted on the shank 164. Said collar or flange is rotatable within a hollow bearing block 171 provided with oppositely presented pins 172 which as shown in Figures 2 and 8 rest within the slotted upper ends of a bifurcated lever arm 173 of a cam lever which is oscillatory mounted on a stud 174. The other arm 175 of said cam lever is provided with a cam roller operating on a cam 176 which is keyed to the cam shaft. It will be understood that a rotation of said cam will impart successive relative axial movements to the movable gripper jaw and thus produce periodic cord-gripping operations during the continued operation of the machine. Suitable means for resisting the opening movements of the gripper may be provided as follows. The elongated shank 164 is held against axial displacement by means of fixed collars 177 and 178 on opposite sides of the bearing 163. Interposed between the collar 177 and the hollow bearing block 171 is a compression spring 179 which is compressed by the cam for opening the gripper jaws and permitted to expand for closing said gripper jaws. Keyed to the elongated gripper shank 164 is a spur gear 180 which meshes with a segmental rack 181. As shown best in Figure 9, said segmental rack is carried by one arm 182 of a cam-lever which is pivotally mounted upon a stud 183, the other arm 184 of said cam-lever being provided with a cam roller 185 which moves in a cam-groove 186 in the lateral face of a cam 187 said cam being keyed to the cam shaft.

*Silk-gripper operation and silk cutter mechanism*

According to Figures 7 and 11, the open ended loop of silk has been presented in the reciprocatory path of the cord-engaging hook 113 carried by the ram 112 which has started on its return movement for doubling the cord and drawing it through the looped strand of silk. During this return movement of the ram 112, the doubled cord is disposed above the closed gripper jaws of the knot-tying chuck while the return movement of the silk-looping plunger has left the loop end of the silk anchored upon the doubled cord as indicated in Figure 28. Suitable means for preventing lateral displacement of the silk during these movements, may be provided as follows. Reciprocably mounted in a housing 188 (see Figure 1), is a rod 189 which carries an arm 190 provided at its outer end with a deflected finger or guard 191 which moves approximately in line with or a little to one side of the axis of reciprocation of the silk-looping plunger. As shown in Figure 1, the rod 189 carries a laterally-presented pin 192 which oscillates in the bifurcated upper end of one arm 193 of a cam-lever which is mounted on a stud 194. The other arm 195 of said cam-lever is actuated by a cam 196 which is suitably formed to impart the movements indicated by the positions of said guard finger shown in Figures 27 to 32 inclusive of the drawings.

As shown in Figure 30, the guard finger 191 is withdrawn from its operative position as the closed jaws of the knot-tying chuck begin to revolve in the direction indicated by the arrow. In the meantime, the oscillatably mounted silk-gripper has been moved by its cam-operated connections into the position shown in Figure 30. As shown in Figure 21, the jaws of the silk-gripper are opened as they approach the doubled strand of silk by reason of the latch-dog 152 riding over the raised end of latch-bolt 153. As the latch-dog 152 leaves said latch-dog, the gripper jaws close upon the silk. At about this time, as indicated in Figure 12, a forwardly-presented pin 197 on the lower gripper-block, comes into engagement with the protruding end of a rack bar 198 which is normally retained in the position shown in Figure 12, by a compression spring 199 which is interposed between said rack-bar and a screw plug 200. As the rack-bar moves inwardly, a small spur gear 201 which meshes therewith is rotated in a clockwise direction on its pintle 202. Secured to the lateral face of spur gear 201 is a curved arm 203 provided in its outer end with a slot 204 within which a stud 205 is adjustably mounted, said stud being threaded into a cutter blade 206. Secured to the lateral face of the lower gripper block by means of a screw 207 is an arm 208 provided with an angular notch 209 in its outer end. Said notch 209 adapts the arm 208 to serve as a combined guide and support for the double strand of silk and as shown in Figure 30 the outer end of arm 208 is offset to permit the cutter blade 206 to descend between it and the gripper. After the silk has been severed in this manner the continued rotary movement of the knot-tying chuck operates to wind the doubled silk around the neck of said chuck adjacent to the laterally-presented jaws and as said jaws approach their position shown in Figure 31, the movable jaw opens and permits the doubled cord to fall between the open jaws of the chuck. As the chuck jaws close upon the doubled cord, the direction of movement of said chuck is reversed as indicated in Figure 32 and at the same time the doubled cord is severed. For this purpose, the following device may be employed.

Cord-severing mechanism

Referring more especially to Figures 2, 7, 30, and 32, a cutter blade 210 which is provided with an inclined cutting edge 210$^a$ as shown best in Figure 7, is secured by a screw 211 to a pad or block 212 at the upper end of a curved arm 213 of a cam-lever which is pivoted upon a stud 214. The other arm 215 of said cam-lever is provided with a cam-roller 215$^a$ which operates over the face of a cam 216 which is keyed to the cam shaft.

As the knot-tying chuck rotates from its position shown in Figure 32 in the direction indicated by the arrows to its position indicated in Figure 33, the pointed shape of the cord-gripping jaws permit the doubled silk to slip off of said jaws while the severed double end of cord is formed into a loop as shown in Figure 33. As the closed jaws continue their upward movement from the position shown in Figure 33, the looped double cord slips from the pointed gripper jaws as the ends of said cord is drawn therethrough about the doubled strand of silk. This stage of the operation is shown in Figure 34. Immediately thereafter the gripper jaws open as shown in Figure 35 after which the return swing of the silk-gripper draws the knot tight as shown in Figure 36. By referring again to Figure 21, it will be understood that if, for any reason, the silk-gripper is released before the return swing of its supporting arm, the latch-bolt would yield sufficiently to permit the passage of the latch-pin carried by the gripper.

Mechanism for removing the completed tassel

Referring now to Figures 1, 2, 5, 16, 17, secured to the top plate or table is a hollow box or housing 217. As shown in Figure 17, the side walls of said housings are provided with oppositely-arranged slots 218 through which the opposite ends of a rotary transverse shaft 219 project. The rotary shaft 219 is journaled in the side plates 220 of a reciprocatory carriage 221 which moves under an adjustable pressure due to a compression spring 222 in which the pressure may be regulated by a thumb screw 223. Secured to a hook 224 on one end of the carriage 221 is one end of a tension spring 225, the end secured to said hook and other end of said tension spring being connected to a fixed post 226 which projects upwardly from the top plate or table. This tension spring tends to retain the carriage in its extreme right hand position according to Figure 15. Keyed to the shaft between the laterally-spaced plates 220 is a spur gear 227 and meshing with said spur gear is a rack 228 on the forward end of a reciprocatory rod 229. The other end of said rod, as shown in Figures 1 and 2, is provided with a slot 230 within which articulates the outer end of a radial arm 231, said radial arm being keyed to the upper end of an oscillatory shaft 232 which is mounted in a bearing 233. The lower end of said shaft as shown in Figure 2 carries a cam-arm 234, said cam-arm being provided with a cam roller 235 which operates in a cam groove 236 in the face of a cam 237 on the cam shaft. Keyed to the outer end of the rotary shaft 219 (see Figure 17), is a lever arm 238 which is provided on its outer end with a claw or hook 239 for engaging the looped cord of a finished tassel. During the forward movement of rack 228, the spur gear 227 rotates until the claw arm 238 has swung through an angle of approximately 180 degrees when its angular movement is interrupted by a yieldably mounted stop 240 supported by a compression spring 241 as shown best in Figure 26. A pedestal 242 houses the yieldably mounted stop 240 and is provided with laterally-spaced guides between which the claw arm 238 is adapted to slide under the continued forward movement of the rack bar. This sliding movement causes the claw 239 to pass between the strands of the looped cord so that upon the return movement of said lever the claw 239 detaches the finished tassel from the silk-gripper and cord-looping hook and delivers it to one of a plurality of radial arms 243 of a counting head 244 (see Figure 1). From an inspection of Figure 1, it will be noted that each of the radial arms 243 is provided on its outer end with a slotted post 245, the slot in said post being adapted to receive the edge of the claw-lever which strikes such post in such a way that the tassel loop is thrown over and hangs upon said post. The construction and operation of the counting mechanism is such that after a predetermined number of the tassels have been lodged upon one of the radial arms 243, said arm is automatically advanced and another moved into charging position. Suitable means for coordinating the operations of the counting mechanism with the remainder of the machine may be provided as follows. A depending bracket or support 246 may be provided with a loop end 247 within which a bolt 248 may be adjusted, said bolt being secured to the reciprocatory rod which actuates the tassel-removing device. Pivotally mounted at 249 on the outer end of said bracket or support is a pawl 250 which at each operation of said reciprocatory rod imparts an angular movement to a ratchet 251. A dog 252 which is pivoted at 253, prevents a retrograde movement of the ratchet. After a predetermined number of tassels have been delivered to one of the radial arms, a stop bolt 254 is automatically retracted from the circular path of a top plate 255 on the rotary head 244, thus permitting a restarting of the counting mechanism for the next group of tassels.

Operation

The sequence of operations has been described above in connection with each particular mechanism as forming a part of the complete machine. A brief general description of the operation of the machine as a whole may be given as follows.

As the reciprocatory head, which feeds the silk and cord, descends to deliver the free ends of silk and cord to their respective grippers, the silk-looping plunger advances and presents an open loop of silk in the path of the cord-looping hook which at the end of its forward movement engages the cord and during its return movement, draws a double strand through the loop of silk. As the silk-looping plunger recedes, the loop of silk is left anchored on the double strand of cord. After the oscillatory silk-grippers have gripped both strands of the silk, the silk-cutting blade severs the silk. The rotary knot-forming chuck which becomes active at about this time, moves the laterally-presented gripper jaws upwardly from their position shown in Figure 27 until after about 180 degrees of movement they come into engagement with the doubled silk as shown in Figure 30. A further turn of 180 degrees causes the knot-forming chuck to form a wind in the doubled silk and during the upward movement of the gripper jaws which follows, said gripper jaws open and permit the doubled cord to drop between the open jaws of said knot-forming chuck. The jaws of the knot-forming chuck now close on the doubled cord which is then severed from the cord supply adjacent to the gripper jaws in such a manner that the cord loop is held by the knot-forming grippers which have closed on the free ends of said cord-loop. As the gripper jaws revolve downwardly from their position shown in Figure 32 and then upwardly into their position shown in Figure 33, a loop is formed in the severed double end of the cord, the severed ends being immediately drawn through said loop by the continued upward movement of the beveled jaws of the gripper under the tension in the cord. Thus, as shown in Figure 34, the knot has been completed in the double severed ends of the cord loop, the closed end of the doubled silk being moreover securely fastened within the knotted cord. The completion of the knot is followed by the return swing of the silk-gripper and as the cord gripper jaws open the knot is released as shown in Figure 35. A continued movement of the gripper-carrying arm draws the knot tight as shown in Figure 36 after which the tassel-discharging hook is introduced through the cord loop as shown in Figure 36 and upon its return reciprocatory movement engages one strand of the cord and delivers it to one of the radial arms.

We claim:—

1. In a tassel-forming machine, the combination of means for doubling a strand of tassel-forming material, means for passing a doubled strand of cord through the doubled end of the tassel-forming material, and means for forming a knot in the doubled cord around the strand of tassel-forming material.

2. In a tassel-forming machine, the combination of means for forming a loop in a strand of tassel-forming material, means for passing a doubled strand of cord through said loop, means for forming a loop in the doubled cord around the first mentioned loop, and means for drawing the looped doubled cord into a knot around the strand of tassel-forming material.

3. In a tassel-forming machine, the combination of means for forming a loop in a strand of tassel-forming material, means for doubling a strand of cord and passing said doubled strand of cord through the first mentioned loop, means for forming the doubled strand of cord into a loop encircling the doubled strand of tassel-forming material and for passing said doubled strand of cord between itself and the doubled strand of tassel-forming material, and means for drawing the doubled strand of cord into a knot around the strand of silk.

4. In a tassel-forming machine, the combination of means for forming a strand of tassel-forming material into a loop, means for doubling a strand of cord and passing it through said loop, means for forming a bend in the looped strand of tassel-forming material and gripping the doubled strand of cord adjacent to said loop, means for severing the doubled strand of cord adjacent to said gripping means, said gripping means being adapted to form a loop in the doubled cord around the looped strand of tassel-forming material and to draw the severed end of the doubled cord through the cord loop to form a knot.

5. In a tassel-forming machine, the combination of means for forming an open-end loop in a strand of tassel-forming material, means operating through said open end loop for drawing a doubled cord therethrough, means for forming a loop in the doubled cord around the first-mentioned loop and with the oppositely extending portions of the doubled cord on opposite sides of the strand in said loop of tassel-forming material, means for gripping the doubled cord beyond the loop therein, means for severing the doubled strand of cord adjacent to said gripping means, and means for drawing the formed loops into a close knot.

6. In a tassel-forming machine, the combination of means for forming a loop in a strand of tassel-forming material, a plunger movable through said loop, said plunger being adapted to engage a strand of cord and to draw it into a loop while passing it through the first mentioned loop, a gripper movable into position to grip both strands of the tassel-forming material at the open end of the loop therein, means for severing both strands of tassel-forming material, an oscillatory knot-forming chuck comprising relatively movable jaws and adapted by its movement in one direction to form a bend in the looped tassel-forming material, means for closing said jaws upon both strands of cord with the tassel-forming material interposed between said strands and said chuck, said chuck by its opposite movement being adapted to form the doubled cord into a loop around the tassel-forming material, means for severing the cord, said jaws when closed being adapted in a predetermined position to release the tassel-forming material, and means for drawing the cord and tassel-forming material into a knot.

7. In a tassel-forming machine, the combination of a reciprocatory plunger adapted by its movement in one direction to form a strand of material into a loop and to present said loop in the path of a cord-doubling plunger, a second reciprocatory plunger movable through said loop and adapted to form a strand of cord into a loop as the doubled strand of cord is drawn through the first mentioned loop, an oscillatory chuck for forming a loop of doubled cord around the first mentioned loop, said chuck being provided with relatively-movable jaws, means for opening and closing said jaws, means for oscillating said chuck in one direction before said jaws close on the doubled strand of cord, means for oscillating said chuck in an opposite direction, means for severing the cord outside of the loop therein, and a gripper for gripping the looped strand of said material, said gripper being adapted to cooperate with the cord plunger in drawing tight the knot.

8. In a tassel-forming machine, the combination of a plunger provided with a loop-forming forward end for forming a loop in a strand of material, a second plunger reciprocable transversely through a loop presented by the loop-forming forward end of the first-mentioned plunger, said second plunger being adapted to double a cord as it is drawn through said loop, an oscillatory chuck comprising fixed and movable jaws for gripping the doubled strand of cord, said oscillatory chuck being adapted during its movement in one direction to form a loop of the doubled cord around the first mentioned loop and to close said gripping jaws upon the doubled cord, and means for severing the doubled cord, said chuck being adapted during its movement in the opposite direction to draw the severed end of the doubled cord to form a knot.

9. In a tassel-forming machine, the combination of a reciprocatory loop-forming plunger, a second reciprocatory plunger movable through the forward end of the first-mentioned plunger, a gripper movable into position to grip a loop of material formed by the first-mentioned plunger, said gripper being provided with a yieldable mount adapting said gripper to maintain said loop under tension but yieldable to a pull on said loop, and an oscillatory chuck for forming a knot in a doubled strand of cord drawn through the loop by the second-mentioned plunger.

10. In a tassel-forming machine, the combination of means for forming a loop of tassel-forming material, a plunger reciprocable through said loop for doubling a cord and passing it through said loop, a gripper movable into position to grip said loop, said gripper being provided with a yieldable mount adapting said gripper to maintain said loop under tension but yieldable to a pull on said loop, and an oscillatory chuck for gripping and forming a knot in the doubled cord around the loop, said gripper comprising relatively movable jaws normally held in closed position by a yieldable pressure and provided with means for momentarily opening said jaws as they approach the loop.

11. In a tassel-forming machine, the combination of means for feeding a strand of cord, a reciprocatory plunger for engaging and doubling said strand of cord, means for presenting a loop of tassel-forming material transversely with respect to the movement of said plunger, a knot-forming chuck oscillatable on an axis and provided with relatively movable gripper-jaws for gripping the doubled cord, and means for severing said doubled cord adjacent to the knot formed therein.

12. In a tassel-forming machine, the combination of a reciprocatory plunger provided with a cord-engaging hook, means for feeding a strand of cord across the reciprocatory path of said plunger, means for presenting a doubled strand of tassel-forming material across the path of said plunger, a yieldably mounted gripper, an oscillatory knot-forming chuck adapted to form a knot in the doubled cord around the doubled strand of tassel-forming material, and means for severing the doubled strand of cord.

13. In a tassel-forming machine, the combination of a reciprocatory plunger provided with a cord-engaging hook, means for feeding a strand of cord across the reciprocatory path of said plunger, means for presenting a doubled strand of tassel-forming material across the path of said plunger, a yieldably mounted gripper for the doubled strand of tassel-forming material, an oscillatory knot-forming chuck adapted to form a knot in the doubled cord around the doubled strand of tassel-forming material, means for severing the doubled strand of cord, said oscillatory chuck comprising an oscillatable shank provided with a laterally-presented gripper jaw and a reciprocable shank provided with a laterally-presented movable gripper jaw.

14. In a tassel-forming machine, the combination of means for forming a loop of silk, a reciprocatory plunger for doubling a strand of cord and passing it through the loop of silk, an oscillatory arm, a silk-gripper oscillatably mounted on said arm, said silk-gripper comprising relatively movable gripper jaws, means for momentarily opening said gripper jaws as they approach the silk loop, means for tying the doubled cord loop in a knot around the material forming the silk loop, and means for imparting a yieldable pressure on said silk-gripper.

15. In a tassel-forming machine, the combination of a reciprocatory plunger provided at one end with an open loop-forming end, means for feeding a strand of tassel-forming material transversely across the path of said plunger, means for gripping the end of said strand, a cord-doubling reciprocatory plunger provided with a hook reciprocable through the open loop-forming end of the first-mentioned reciprocatory plunger, means for feeding a strand of cord across the path of said hook, means for gripping the end of the cord strand, and an oscillatory knot-forming chuck provided with relatively movable jaws for gripping the doubled cord.

16. In a tassel-forming machine, the combination of a silk-looping plunger, a cord-doubling plunger reciprocable transversely with respect to the reciprocatory path of the first-mentioned plunger, means for supplying continuous strands of silk and cord to said plungers respectively, a silk gripper, means for severing the strand of silk from the looped silk carried by said gripper, and an oscillatory chuck provided with relatively movable gripper jaws for forming a knot in the cord.

17. In a tassel-forming machine, the combination of means for forming an open loop in a strand of material, means for forming an open loop in another strand of material and passing the closed end of the second-mentioned loop through the first-mentioned loop, an oscillatable gripper-arm, a gripper oscillatably mounted on said gripper-arm, said gripper-arm being movable into position to permit said gripper to grip both branches of the first-mentioned strand of material near the open end of the loop therein, means tending to hold the jaws of said gripper closed, means for momentarily opening said gripper jaws as they approach the loop in the first-mentioned strand, means for maintaining a yieldable tension on said gripper in the direction of its oscillatory movement on the gripper arm, and means for tying the open end of the loop in the second-mentioned strand of material in a knot around the closed end of the first-mentioned open loop.

18. In a tassel-forming machine, the combination of a reciprocatory plunger provided at one end with an open end eyelet, means for feeding a continuous strand of material across the path of said plunger, said plunger being adapted by its reciprocatory movement and said open end eyelet to form a loop in said continuous strand of material, a second plunger reciprocable through said loop, said second plunger being provided with a material-engaging hook, means for feeding a second continuous strand of material across the path of said hook, and an oscillatory knot-forming chuck for connecting said strands.

19. In a tassel-forming machine, the combination of a loop-forming plunger, a second plunger reciprocable transversely with respect to the reciprocatory path of the first-mentioned plunger, means for supplying strands of different materials to said plungers respectively, the second-mentioned plunger being provided with a hook for engaging and drawing a double strand of one material through the loop formed in the strand of the other material, and an oscillatory chuck provided with laterally-presented gripping jaws for forming a knot in the doubled strand around the looped strand.

20. In a tassel-forming machine, the combination of means for forming an open loop in a strand of material, means for doubling another strand of material and passing the return bend therein through the loop in the first-mentioned strand, a gripper movable into and out of position to grip both branches of the first-mentioned strand near the open end of the loop, means for opening and closing said gripper, means for severing the looped portion from the first-mentioned strand, means for severing the doubled portion from the second-mentioned strand, and a chuck for knotting the looped and doubled strands together, said chuck comprising a spindle oscillatable on an axis and provided with a fixed laterally-presented gripper-jaw and a shank reciprocable on said spindle and provided with a laterally-presented gripper-jaw adapted to cooperate with the first-mentioned gripper-jaw for tying the loose ends of the doubled strand in a knot around the closed end of the looped strand.

21. In a tassel-forming machine, the combination of periodically operated grippers for gripping the successive ends of strands of silk and cord respectively, means for feeding strands of silk and cord to said grippers respectively, means for forming an open-end loop in the strand of silk, means operating through said open-end loop of silk for drawing a double strand of the other of said strands therethrough, means for severing the open-end loop portion from the strand of silk, means for severing the doubled portion from the strand of cord, and means for forming a knot in the doubled portion of the strand of cord around the severed portion of the strand of silk at the closed end of the loop.

22. In a tassel-forming machine, the combination of a reciprocable silk-looping plunger, means for supplying a continuous strand of silk thereto, a second reciprocable plunger for doubling a strand of cord, means for supplying a continuous strand of cord to said second reciprocable plunger, means for severing the looped portion of the silk, means for severing the doubled strand of cord, an oscillatory chuck comprising relatively movable jaws for gripping both strands of cord, means for rotating said chuck in one direction and opening said jaws to admit the cord and for rotating said chuck in an opposite direction and closing said jaws to grip said cord, said relatively movable gripper jaws being suitably shaped to form a loop in the double strand of cord and to permit said loop to slide therefrom over the gripped ends of said cord and to form a knot around the strand of silk.

23. In a tassel-forming machine, the combination of a reciprocatory cross-head provided with spaced tubular guides, means for supplying strands of material to said guides respectively, automatic grippers for gripping successive ends of each of said strands presented thereto, means for forming an open-end loop in one of said strands, means operating through said open-end loop for doubling the other of said strands and drawing the doubled strand through said open end loop, and means for forming a knot connecting said doubled strand of cord to said open-end loop of silk.

24. In a tassel-forming machine, the combination of means for forming a loop in a strand of silk, means for doubling a cord and passing it through the loop of silk, a knot-forming chuck oscillatable successively in opposite directions and including laterally-presented jaws for gripping both strands of cord, means for opening and closing said gripper jaws for admitting and gripping both strands of the cord, means for severing the doubled cord, and a yieldably-mounted silk gripper, said laterally-presented cord-gripping jaws being suitably shaped to form a loop in the doubled strand of cord and to permit said loop to slide therefrom over the gripped ends of the cord and around the closed end of the silk loop.

25. In a tassel-forming machine, the combination of a reciprocatory cross-head provided with spaced tubular guides, means for supplying strands of silk and cord to said guides, brakes for preventing retrograde movements of said strands through said guides, silk and cord grippers for anchoring successive ends of said strands of silk and cord, means for forming an open-end loop in the strand of silk, a second silk-gripper for gripping the doubled strand of silk at the open end of the loop, means operating through said open-end loop of silk for drawing a doubled strand of the cord therethrough, means for severing the open-end loop from the strand of silk, means for severing the doubled portion from the strand of cord, and means for forming a knot in the severed ends of the doubled strand of cord around the closed end of the open end loop of silk.

26. In a tassel-forming machine, the combination of means for forming an open loop in a strand of silk, a yieldably mounted silk gripper for gripping the double strand of silk at the open end of the silk loop, means for severing the looped portion from the strand of silk, means for doubling a cord and passing it through the loop of silk, an oscillatory chuck including laterally-presented jaws for gripping the double strand of cord, means for oscillating said chuck in opposite directions, and means for moving one of said jaws axially away from the other to admit the strands of cord and closing said jaws thereon during the movement of said chuck in one direction, said laterally-presented cord-gripper jaws being suitably shaped to form a loop in the double strand of cord and to permit said loop to slide therefrom over the gripped ends of said cord.

27. In a tassel-forming machine, the combination of means for forming an open loop in one strand of material, means operating through said open loop for doubling another strand of material and drawing said doubled strand through the loop, a chuck oscillatable about an axis, said chuck having laterally-presented normally-closed tapered jaws which form a tapered horn adapted by an oscillatory movement in one direction to form a bend in the looped strand adjacent to the doubled strand, means for momentarily opening the laterally-presented jaws to admit the doubled strand and to permit said jaws to close thereon beyond the looped strand, means for severing the doubled strand, said chuck being adapted by its return oscillatory movement to wind the doubled strand around said tapered horn for encircling the looped strand with the doubled strand, and means for imparting a yieldable tension to the looped and doubled strands whereby the encircling portion of the doubled strand is drawn from said tapered horn over the severed end of the doubled strand and drawn into a knot.

28. In a tassel-forming machine, the combination of means for forming an open loop in one strand of material, means operating through said open loop for doubling another strand of material and drawing said doubled strand through the loop, means for gripping the looped strand at a distance from the closed end of the loop, means for severing the looped portion of the first-mentioned strand, an oscillatable chuck provided with laterally-presented normally-closed tapered jaws which form a tapered horn adapted by an oscillatory movement in one direction to form a bend in the looped strand, one of said jaws being movable axially in one direction to admit the doubled strand and in the opposite direction to close upon the doubled strand, means for severing the doubled strand, said chuck being adapted by its return oscillatory movement to wind the doubled strand around said tapered horn, said means for gripping the first-mentioned strand being resiliently mounted and adapted to impart a tension to said strands whereby the coiled portion of the doubled strand is drawn from the tapered horn over the severed end of the doubled strand and drawn into a knot.

29. In a tassel-forming machine, the combination of means for forming an open loop in a strand of material, means operating through said open loop for doubling another strand of material and drawing said doubled strand through said open loop in the first-mentioned strand, means for gripping the looped strand at a distance from the closed end of the loop therein, said gripping means being provided with a spring for yieldably drawing the open loop taut about the doubled strand, a chuck oscillatable about an axis and having laterally-presented tapered jaws which are normally closed to form a tapered horn adapted by an oscillatory movement of the chuck in one direction to impart an angular displacement to the looped strand, means for momentarily opening the laterally-presented jaws to admit the doubled strand therebetween and for closing said jaws upon the doubled strand, means for severing the doubled strand, said chuck being adapted by its return oscillatory movement to wind the doubled strand around said tapered horn, said tapered horn being adapted to permit the coiled portion of the doubled strand to slip therefrom over the gripped severed ends of the doubled strand, the gripping means for the first-mentioned strand being adapted by its spring to draw the doubled second-mentioned strand into a knot about the included portion of the first-mentioned strand.

WILLIAM T. McSHEA.
ALEXANDER C. PARLINI.
EMIL RICHTER.